United States Patent [19]
Flechel

[11] Patent Number: 5,220,851
[45] Date of Patent: Jun. 22, 1993

[54] LOCKING SHOCK ABSORBER FOR BICYCLE HANDLEBARS

[76] Inventor: Kevin R. Flechel, S. 1808 Maple Blvd., Spokane, Wash. 99203

[21] Appl. No.: 913,165

[22] Filed: Jul. 14, 1992

[51] Int. Cl.$^5$ .............................................. B62K 21/14
[52] U.S. Cl. ............................... 74/551.2; 74/551.6; 403/85; 403/148; 403/229
[58] Field of Search ............. 74/551.2, 551.3, 551.5, 74/551.6; 403/85, 145, 148, 229

[56] References Cited

U.S. PATENT DOCUMENTS

| | | | |
|---|---|---|---|
| 583,483 | 6/1897 | Kellogg | 74/551.2 |
| 626,602 | 6/1899 | Fenton | 74/551.2 |
| 654,483 | 7/1900 | Neff | 74/551.2 |
| 841,450 | 1/1907 | Rosen | 74/551.2 |
| 897,579 | 9/1908 | Brannan | 74/551.2 |
| 1,053,150 | 2/1913 | Bouillat | 74/551.2 |
| 1,060,442 | 4/1913 | Erickson | 74/551.2 |
| 1,640,454 | 8/1927 | Kühn | 74/551.2 |
| 2,125,644 | 8/1938 | Moller | 74/551.3 |

FOREIGN PATENT DOCUMENTS

| | | | |
|---|---|---|---|
| 408511 | 11/1910 | France . | |
| 423744 | 4/1911 | France | 74/551.2 |
| 564458 | 12/1923 | France | 74/551.2 |
| 596504 | 10/1925 | France | 74/551.2 |
| 599867 | 1/1926 | France | 74/551.2 |
| 10981 | 5/1904 | United Kingdom . | |
| 439702 | 8/1934 | United Kingdom . | |

Primary Examiner—Leslie A. Braun
Assistant Examiner—Andrea Pitts
Attorney, Agent, or Firm—Keith S. Bergman

[57] ABSTRACT

A lockable shock absorber interconnecting the upper portion of a bicycle front wheel fork with a handlebar thereabove provides releasably joinable body extending upwardly from the bicycle fork and pivotally mounting in its upper portion an elongate handlebar arm releasably carrying a handlebar in its end portion. The handlebar arm is biased in an upwardly angled orientation, but movable downwardly against its bias to absorb shock. Biasing is provided by a compression spring carried about a depending spring rod pivotally mounted in the medial portion of the handlebar arm. The lower portion of the compression spring is supported on a bracket carried by the body and the spring rod is slidably carried within a vertical hole defined in the bracket. A horizontal fastening pin slidably carried by the bracket perpendicular to the spring rod is movable from a first position locking the spring rod relative to the bracket to a second position allowing motion of the spring rod relative to the bracket.

3 Claims, 1 Drawing Sheet

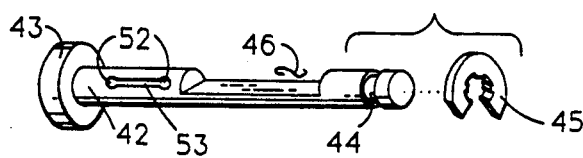
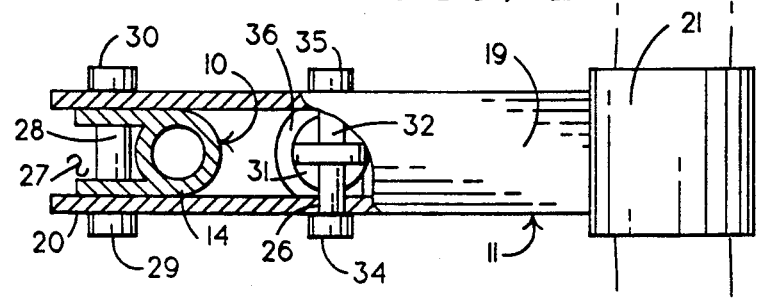
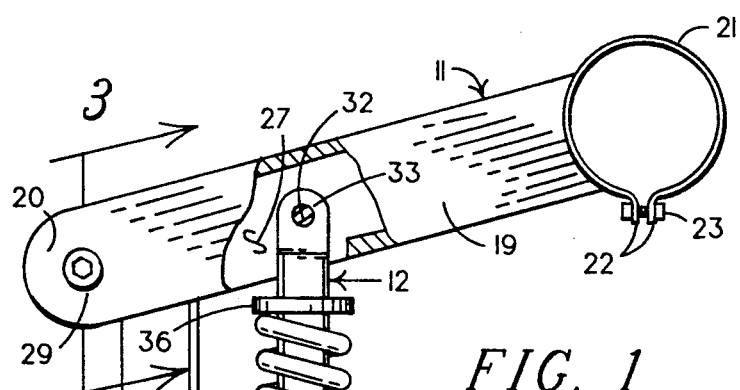
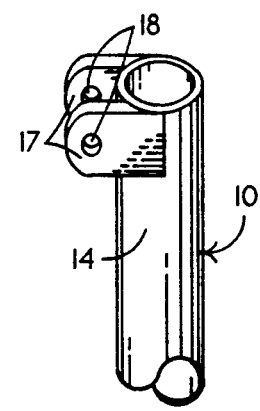
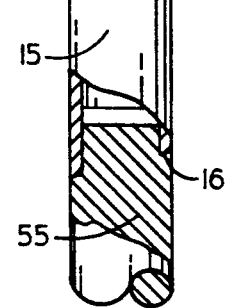
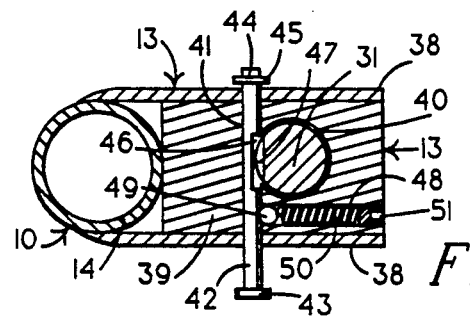

LOCKING SHOCK ABSORBER FOR BICYCLE HANDLEBARS

BACKGROUND OF INVENTION

1. Related Applications

There are no applications related hereto now filed in this or any foreign country.

2. Field of Invention

My invention generally relates to a shock absorbing handlebar mount that allows limited biased vertical motion of a bicycle handlebar, and more particularly to such a shock absorber that has fastening means to selectively lock the shock absorbing mount in a fixed position.

BACKGROUND AND DESCRIPTION OF PRIOR ART

Shock absorbing systems associated with the handlebars of a bicycle to lessen some of the shock generated by bicycle riding that is transmitted to a rider through the handlebar structure have long been known, and such devices have become increasingly popular in the modern day with the increase of bicycle riding on trails and rougher terrain. Such shock absorbing devices may, for convenience of consideration, be divided generally into a first class comprising devices that in some fashion limit the rotary motion of handlebar structure relative to its frame supported mount, and a second class of such devices that allow restrained vertical motion of the handlebar mounting structure relative to the bicycle frame.

The first class of shock absorbers is larger and more popular in the bicycle arts, undoubtedly because of the simpler operation and structure of such devices. This type of shock absorber, however, presents several inherent problems that reduce its efficiency and desirability.

Handlebar structures in modern bicycles are widely varied in their configuration, with some ultimately positioning handlebars rearwardly of the support point and others positioning them forwardly of that point. The handles may be either above or below the support point, and the shape of the handlebar may vary from a substantially straight beam to a sinuous tube defining compound and complex curves. The handlebars also may be grasped at points other than normal handle structure. Since the handlebars act as a lever arm about their mounting point in transmitting shock, the varying positions of handles provide widely varied results of shock absorption.

Shock absorbers of the first class therefore generally must be specifically designed for a particular handlebar structure, and normally are not efficiently operable with different handlebar structures. Additionally this type of shock absorber generally must deal with relatively large forces that are exerted over relatively short distances which tends to make the absorbers difficult to design for proper shock absorption without lessening their utility and also tends to require structures which are more delicate and less maintenance free than other shock absorbers. This first class of shock absorbers, for these reasons, is readily distinguishable from the second class.

The second class of shock absorbers that limit vertical motion of handlebar mounting structure though stronger, more durable and more maintenance free, have in the past often tended to be overly complex and less uniform in their operation largely by reason of poor design rather than any structurally inherent disability. Most importantly, however, shock absorbers of this second class have not provided any structure that will disable the shock absorbing mechanism and maintain the handlebar in a fixed position when desired. Such a locking feature is desirable in bicycle handlebars at times when a rider is actively exerting such as when propelling a vehicle up hill or straining to accelerate, because the rider may exert force on the handlebars as an aid to his exertion. When this is done with a movable shock absorber, the handlebars tend only to move responsively to the force exerted by a rider and this motion tends to be counter-productive and undesirable in aiding the rider's exertion. Aside from the physical effect, the psychological effect of the handlebar structure's moving responsively to the rider's exertion is generally not desirable and oftentime psychologically disturbing because of the normal rider's lack of familiarity with such happening.

My invention provides a new and novel shock absorber of the second class that solves these problems by providing a locking mechanism that selectively allows the shock absorber to operate or locks the mechanism rigidly so that the handlebar structure cannot move relative to its mounting or the bicycle frame, in the same fashion a normal handlebar not having an associated shock absorber. The particular structure which accomplishes this locking is of a simple, strong, reliable and durable nature.

My invention is further distinguished from known members of the second class in that it provides a total mounting structure, communicating between the upper shaft of a bicycle front wheel fork and a handlebar, which can be mounted upon existing bicycles, whereas other known members of the second class of shock absorbers have generally required particular and specific configuration for their use with a particular bicycle and cannot be used with ordinary standardized bicycles. Additionally my shock absorbing device generally allows the interconnection of any type of handlebar structure, with the attachment point offset from the axis of the front wheel fork shaft in either a forward or rearward direction as the particular handlebar structure may require.

In providing such a device, it should be remembered, however, that its novelty resides not in any one of these features, but rather in the synergistic combination of all of its structures that give rise to the functions necessarily flowing therefrom as herein specified and claimed.

SUMMARY OF INVENTION

My invention provides a body rod releasably interconnectable to the upper portion of the shaft of a bicycle wheel fork to extend upwardly therefrom. The body rod pivotally mounts an elongate, upwardly angulated handlebar mounting arm releasably interconnecting a handlebar in its outer end portion. A spring rod pivotally depends from the medial portion of the handlebar arm into a vertical hole defined in a bracket support by the body rod for vertical motion in that hole. The spring rod carries a compression spring thereabout to bias the handlebar arm to its upwardly angulating null position but allows downward motion against the spring. The bracket through which the spring rod passes slidably carries a horizontal pin removable from a first position which allows free vertical motion of the spring rod relative to the bracket to a second position which mechanically locks the spring rod relative to the bracket to rigidly fix the position of the handlebar arm and of a handlebar carried thereby.

In creating such a shock absorber for a bicycle handlebar, it is:

A principal object to provide a shock absorber to releasably interconnect the upper shaft of a bicycle wheel fork that biases the handlebar to an upward angulated null position but allows downward motion against a spring bias.

A further object is to provide such a device having mechanical linkage that articulates for shock absorption but may selectively be rigidly interconnected to prevent motion of the handlebars relative to the bicycle.

A further object is to Provide such a device that is completely self-contained and may be established and used on most existing bicycles having a front wheel fork with an upper upstanding shaft without modification of either the existing bicycle or handlebar structure.

A still further object is to provide such a device that is of new and novel design, of rugged and durable nature, of simple and economic manufacture and otherwise well adapted to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only one preferred and practical embodiment of the best known mode being illustrated and specified as required.

BRIEF DESCRIPTION OF DRAWINGS

In the accompanying drawings which form a part hereof and wherein like numbers of reference refer to similar parts throughout:

FIG. 1 is an orthographic side view of my invention with portions cut away to show various of its parts, their configuration and relationship.

FIG. 2 is an orthographic top view of the device of FIG. 1, with portions cut away to show internal structure and a supported handlebar shown partially in dashed outline.

FIG. 3 is a vertical cross-sectional view through the handlebar arm of FIG. 1, taken on the line 3—3 thereon in the direction indicated by the arrows.

FIG. 4 is an expanded, isometric view of the locking pin of my device and its retaining ring.

FIG. 5 is a horizontal, cross-sectional view through the fastening bracket structure of FIG. 1, taken on the line 5—5 thereon in the direction indicated by the arrows.

FIG. 6 is an isometric view of the upper portion of the body rod showing particularly the structure pivotally mounting the handlebar arm thereon.

DESCRIPTION OF THE PREFERRED EMBODIMENT

My invention generally provides an upstanding body shaft 10 irrotatably communicating with the shaft of a front wheel fork of a bicycle and pivotally carrying in its upper portion handlebar arm 11 to mount a handlebar, with a pivotally mounted spring biasing structure 12 depending from the medial portion of the handlebar arm into communication with fastening bracket 13 therebeneath which selectively locks the spring biasing structure within the fastening bracket.

Body shaft 10 provides elongate tube 14 structurally carrying in its lower portion diametrically larger fastening collar 15 in its lower portion having angulated lower surface 16 adapted to interfit with the upper portion of the upper shaft 55 of a front wheel yoke (not shown) of a bicycle for irrotatable mounting thereon. The upper connecting portion of the shaft 55 of most bicycle front wheel forks are reasonably standardized in configuration and the fastening collar 15 will interfit with most such structures without modification for use on existing bicycle structures. As seen in FIG. 6, the upper portion of tube 14 provides structurally interconnected paired opposed ears 17 defining pin holes 18 to allow pivotal mounting of handlebar arm thereon.

Handlebar arm 11 comprises an elongate peripherally defined box beam 19 having rounded shaft end portion 20 and carrying handlebar fastening ring 21 at its end distal from shaft 10. The handlebar fastening ring 21 is a split fastening ring with similar spacedly opposed normally projecting fastening ears 22, each defining cooperating holes to receive bolt-nut combination 23 therebetween to allow positioning of a handlebar structure therein provide positional maintenance thereafter. The rearward portion of the lower surface of beam 19 is removed to define elongate orifice 27 to allow passage of the upper portion of rod 14 and spring biasing structure 12 therethrough. The rearwardmost portion of each vertical side of beam 19 define paired opposed holes 25 to receive pivot pin 28 to pivotally mount the handlebar arm on the body shaft. The medial portions of the vertical sides of the box beam define paired opposed cooperating holes 26 to pivotally mount a pin to interconnect the upper portion of spring biasing structure to the box beam.

The mounting of the handlebar arm on the body shaft is shown in FIGS. 2 and 3. The size of channel 27 defined in the bottom of the box beam is such as to movably receive the upper portion of tube 14 and its attached fastening ears 17, as illustrated in FIG. 2. Pivot pin 28 extends between holes 25 in the vertical sides of box beam 19 and through holes 18 in fastening ears 17 to pivotally mount that arm on the upper portion of the body shaft. In the instance illustrated, pivot pin 28 comprises a bolt having head 29 and nut 30 for positional maintenance, though this type of fastener is not necessary and other pivot pins may serve the purpose so long as they have some means for positional maintenance.

Spring biasing structure 12 provides elongate spring rod 31 pivotally mounted in its upper end on spring rod pin 32 extending between holes 26 defined in the handlebar arm and cooperating pin hole 33 defined in the upper end of the spring rod. Spring rod pin 32 defines head 34 at one end and nut 35 threadedly engaged on the other end to provide positional maintenance in the holes 26. The spring rod structurally carries annular spring stop 36 spacedly beneath the lower surface of box beam 19 and depends into a spring rod hole defined in fastening bracket 13 therebelow. Compression spring 37 is carried about the medial portion of spring rod 31 between fastening bracket 13 and annular spring stop 36.

Fastening bracket 13 is a compound structure providing similar side elements 38 carrying bracket body 39 therebetween. The two sides are structurally interconnected to body 39 and the entire bracket is structurally interconnected to tube 14 spacedly below the handlebar arm in a position to communicate with the lower portion of spring rod 31. The bracket body defines vertical spring rod hole 40 to slidably receive the lower portion of spring rod 31 and support the lower end of the compression spring. Fastening pin hole 41 is defined to extend horizontally through both bracket sides 38 and bracket body 39 to slidably carry fastening pin 42. The fastening pin hole is defined in such position as to intersect some peripheral portion of the spring pin to define cylindrical fastening pin groove 47 therein to slidably receive the body of fastening pin 42 when that pin be appropriately axially position. The fastening pin 42 is of a length somewhat greater than the distance between the outside surfaces of bracket sides 38 and defines head 43 at one end and annular fastening clip groove 44 inwardly adjacent the other end to receive fastening clip 45 to positionally maintain the pin within the fastening pin hole. The medial portion of the fastening pin body 42 defines slot 46 to allow spring rod 31 to move vertically relative to the fastening pin when the pin is appropriately axially positioned. The axial length of slot 46 is greater than the length of fastening pin groove 47 so that the pin may be axially moved with a portion of its body within fastening pin groove 47 to positionally maintain the spring rod 31 relative to body 39 of the bracket 13.

Bracket body 39 defines detent hole 48 communicating from the outer surface of the body to the fastening pin hole 41. This detent hole carries in its inner portion ball 49 biased inwardly by compression spring 50 carried in the detent hole and there maintained by cap screw 51 threadedly engaged in the outer portion of the hole. The outer surface of fastening pin 42 between head 43 and slot 46 defines spaced detent holes 52, to receive a portion of ball 49, with slot 53 extending in an axially parallel orientation therebetween to maintain the rotary position of the fastening pin relative to bracket body 39 when that pin be moved in an axial direction.

The length of fastening pin 42 between the inner surface of fastening clip 45 and head 43 is substantially the distance between the outer surfaces of bracket sides 38 plus the length of slot 46 to allow appropriate sliding motion of the fastening pin when moved in an axial direction. The slot 46 is positioned so that when fastening clip 45 is adjacent one side of bracket 13, slot 46 will be in a position to allow vertical motion of spring rod 31. The detent holes 52 are so positioned that when either head 43 or clip 45 of the fastening pin are adjacent one side of fastening bracket 13, the ball 49 will fit in one hole, and the length of channel 53 extending between the detent holes is substantially equal to the axial length of slot 46.

All of the elements of my invention described are preferably formed of metal to provide appropriate rigidity, durability and other necessary physical characteristics. Normally this metal should be as light as possible to yet provide the required physical characteristics and because of this, an alleged chrome steel is the preferred material for non-elastic elements. It is possible that various of the parts of my apparatus might be formed of plastic, but in general plastic materials are not appropriate because with reasonable sizes and configurations, they do not provide elements of appropriate strength and durability, at least at reasonable cost.

Having thusly described my invention, its use may be understood.

A shock absorber is constructed according to the foregoing specification and fastened upon the upper part of the upper shaft of a bicycle front wheel fork. This fastening is accomplished by lower fastening collar 15 which fits over the front wheel fork shaft in irrotatable fashion. The collar 15 may be particularly designed and configured to accommodate fastening on the shaft of any bicycle front wheel fork, though the shaft structures of most bicycles have become reasonably standardized in design and the collar illustrated fits upon many such structures. My shock absorber will replace a normal handlebar mounting structure provided by existing bicycles and in general will be of substantially the same dimension so that when mounted on the shaft of the front wheel fork, it will position a handlebar in substantially the same position as the original fork would have done. If this not be the case, the length of body shaft 14 or handlebar arm 11 may be appropriately adjusted to position a handlebar to be carried by my device in the appropriate position.

With my shock absorber in place on a bicycle, an appropriate handlebar structure 54 is attached to it. The handlebar fastening ring 21 is relaxed by loosening nut-bolt fasteners 23 and the end portion of a handlebar is then inserted through the channel defined by the fastening ring. If desired, the nut-bolt fasteners 23 may be completely removed to allow the insertion of a handlebar structure by spreading the fastening ring, but normally this is neither convenient nor necessary. With the handlebar structure is established and appropriately positioned within the fastening ring, nut-bolt fasteners 23 are re-tightened to structurally interconnect the handlebar structure. My shock absorber is usable with almost any handlebar structure, including straight beam-like structures and those that are more tubular vertically, horizontally or both. If necessary, the configuration of the fastening ring 21 may be modified to allow fastening of particular handlebar structures, but normally a ring type device as illustrated will fasten substantially all presently used handlebar structures.

After establishment of my shock absorber on a bicycle, the vehicle is used by a rider in ordinary fashion. When riding, a rider normally supports himself to some degree by reason of gripping on the handlebar structure. As the bicycle traverses rough and irregular terrain, motions transmitted by that terrain to the bicycle wheels and frame are transmitted by them to the rider and often, since the rider is not fixedly positioned relative to the frame, inertia of the bicycle system may be and generally is different than the inertia of the bicycle itself or of the rider to create relative motion and so-called "shock". This shock may be and has been dealt with in various bicycles my devices associated with the bicycle wheels and their mounting structures and by devices associated with the bicycle seat, as well as those associated with the handlebar structure. In general for normal bicycle riding conditions, it is desirable to lessen the shock as much as possible, especially when transmitted to a rider through the handlebar structure, as this may not only be aesthetically unpleasant but may tend to disrupt the control of the bicycle, especially in riding over rough terrain such as mountain trails and the like. At other times, however, especially when a bicycle rider is riding under strain such as in racing or pedalling up hill, he may support himself partially on the handlebar structure and in this instance, it is desirable that that structure be fixedly positioned so as not to change the nature of a rider's support operation by reason of varying forces applied by the rider or by the bicycle operation.

To use my device as a shock absorber, fastening pin 42 is moved in an axial direction out of fastening engagement with spring rod 31 by aligning slot 46 defined in the fastening pin with slot 47 defined in the fastening pin. In this condition, spring rod 31 may move vertically and be restrained in its downward motion only by compression spring 37 to act as an ordinary spring biased shock absorber to absorb shock caused by vertical motion of an associated handlebar structure.

If it be desired that the handlebar structure should be fixedly positioned, the fastening pin 42 is moved so that its body is within groove 47 defined in spring rod 31. With the fastening pin in this position the spring rod is fixedly maintained within fastening bracket 13 and may not move vertically relative thereto so that the entire shock absorber structure is locked and serves merely as a rigid linkage between the handlebar and the front wheel fork of a bicycle, in the same fashion as a non-shock absorbing mounting structure.

It is to be noted in moving fastening pin 42, that the pin will tend to be maintained in either extreme positions by reason of the spring loaded ball 49 being positioned in detent holes 52 at either end of the channel 53. The channel 53 will maintain the proper rotary position of the fastening pin relative to the fastening bracket and ball 49 during axial motion of the pin. The fastening pin will be prevented from moving out of engagement within bracket 13 by reason of its head 43 at one end and fastening clip 45 at the other.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and What I claim is:

1. An articulating shock absorber, to interconnect a handlebar structure with a shaft of a front wheel fork of a bicycle, which is selectively locked in rigid interconnection, comprising in combination:

a body shaft having means for interconnection with the upper portion of a shaft of a front wheel fork of a bicycle and at least one fastening ear extending from the upper portion thereof;

a handlebar arm pivotally mounted on the fastening ear of the body shaft and extending spacedly from the body shaft, said handlebar arm having handlebar fastening means in its outer end portion and medial means to pivotally mount a depending spring biasing rod;

a spring biasing structure having an elongate spring rod depending from pivotal mounting on the handlebar arm, said spring rod defining an annular spring stop spaced below the handlebar arm, carrying a compression spring about its periphery below the spring stop, and defining a horizontal cylindrical fastening pin channel in its lower portion; and a fastening bracket carried by the body shaft spaced below the handlebar arm to extend beneath the handlebar arm and past the depending spring rod, said fastening bracket defining a channel to slidably receive the lower portion of the spring rod and having fastening means communicating between the fastening bracket and the spring rod to selectively prevent and allow motion between those elements.

2. The apparatus of claim 1 further characterized by the fastening means communicating between the fastening bracket and the spring rod comprising:

an elongate fastening pin extending through a hole defined in the fastening bracket to communicate with the fastening pin channel defined in the spring rod, said fastening pin being selectively movable in an axial direction and defining a slot, said pin being movable to a first position wherein the slot is adjacent to the spring rod to allow the spring rod to move vertically relative to the bracket and to a second position wherein the slot is spaced from the spring rod to prevent motion of the spring rod.

3. The apparatus of claim 1 further characterized by:

the fastening ear of the body shaft extending in a direction opposite to the direction of extension of the handlebar arm from the body shaft.

* * * * *